E. S. STIMPSON.

TEMPLE THREAD CUTTER FOR LOOMS.

APPLICATION FILED DEC. 7, 1917.

Reissued Jan. 8, 1918. 14,420.

Inventor.
Edward S. Stimpson
by Heard Smith & Tennant.
Attys.

UNITED STATES PATENT OFFICE.

EDWARD S. STIMPSON, OF HOPEDALE, MASSACHUSETTS, ASSIGNOR TO DRAPER CORPORATION, OF HOPEDALE, MASSACHUSETTS, A CORPORATION OF MAINE.

TEMPLE THREAD-CUTTER FOR LOOMS.

14,420. Specification of Reissued Letters Patent. Reissued Jan. 8, 1918.

Original No. 1,244,791, dated October 30, 1917, Serial No. 176,432, filed June 22, 1917. Application for reissue filed December 7, 1917. Serial No. 206,102.

*To all whom it may concern:*

Be it known that I, EDWARD S. STIMPSON, a citizen of the United States, and resident of Hopedale, county of Worcester, State of Massachusetts, have invented an Improvement in Temple Thread-Cutters for Looms, of which the following description, in connection with the accompanying drawing, is a specification, like characters on the drawing representing like parts.

This invention relates to improvements in temple thread cutters for looms and the object thereof is to provide a simple form of thread cutting device in which the stationary blade or blades may be more securely anchored than in previous constructions.

A further object of the invention is to provide a temple thread cutter with a novel form of means for forcing the moving blade into engagement with the stationary blade whereby an effective shearing action upon the filling end will be insured.

Other objects and features of the invention will more fully appear from the following description and the accompanying drawings and will be particularly pointed out in the annexed claims.

Figure 1:
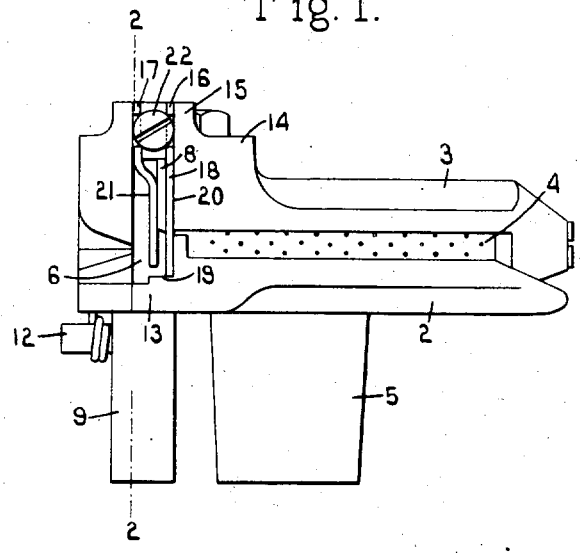
Figure 1 is an end elevation of a temple head and adjacent parts.

The present invention contemplates a modification of the usual thread cutting temple to permit the stationary cutting blades to be supported by the cap of the temple instead of the pod as in the usual construction. By reason of this change in structure the stationary cutting blades can be much more securely fastened to the temple and also means conveniently provided for forcing the movable blade firmly against the stationary blade so as to insure a proper shearing coöperation between said blades.

The temple thread cutter shown in the accompanying drawing comprises a bar 1 carrying at its end a head comprising the pod 2 which is integral with said bar and a cap 3 which is secured to the pod, the toothed roll 4 being rotatably mounted between said pod and cap in the usual manner. A heel 5 which depends from the head of the temple is adapted to be struck by the lay upon its beat up to move the temple forward in the usual manner.

The body and cap are substantially of usual construction and provide a guideway 6 in which the cutter carrier 7 is pivotally and slidably mounted.

The cutting blade 8 of U-shaped form is rigidly secured to the front end of the cutter carrier while the rear end of the cutter carrier has a downward extension or heel 9 adapted to be engaged by the moving lay to operate the cutter, the heel 9 being normally located in advance of the heel 5 of the temple.

Figure 2:
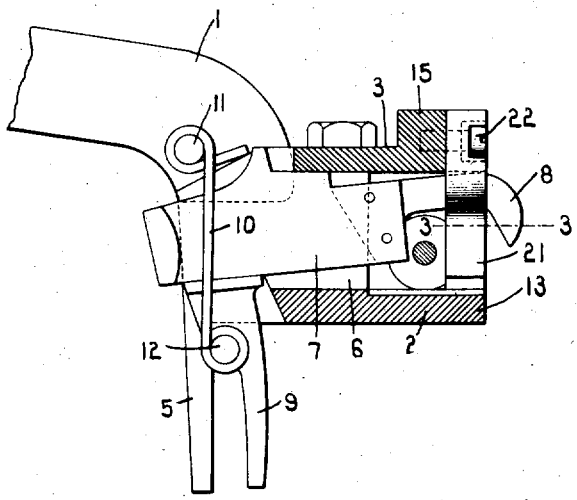
Fig. 2 is a vertical sectional view of the temple thread cutter on line 2—2 Fig. 1.

The cutter carrier and cutter are normally maintained in the extended position illustrated in Fig. 2 by a spring 10 connected at one end to a post or stud 11 on the bar 1 and at the opposite end to a stud 12 projecting from the cutter heel 9, the action of the spring being such as to force the cutting blade 8 beyond the front end of the temple.

The construction thus far described is of the usual character. In the usual construction of temple thread cutter the stationary blade which coöperates with the pivotal and forwardly and backwardly movable blade 8 is secured in a slot in the pod and extends vertically upward across the mouth of the guideway 6 in which the movable blade reciprocates. While this construction is commonly employed in loom temples having a single stationary blade the base portion 13 of the pod beneath the guideway 6 is found to be weakened too much if a second slot for the supplemental blade or spring is made in it.

Since, in the operation of the loom the lay passes closely beneath the temple, no room is afforded which will allow the thickening or reinforcing of the base portion 13 of the pod to give sufficient strength to support an additional stationary cutter or spring.

In order to obviate this difficulty the present invention contemplates the provision of means for supporting the stationary blade or blades of the temple thread cutter from the cap portion instead of the pod. To this end the portion 14 of the cap is thickened or preferably provided with a boss 15 of sufficient thickness and strength to enable the same to be slotted to receive a stationary blade and in addition thereto a spring plate which may coöperate with the backward and forwardly moving blade and which will serve to maintain the movable cutter in constant shearing relation with the stationary blade and which also may if desired provide a second cutting blade. Inasmuch as no movable instrumentality passes over the temple thread cutter in close proximity to the cap thereof any desired thickness of metal may be provided to effect the purpose set forth.

As illustrated in the drawing parallel slots 16, 17 are formed in the boss 15 directly above the mouth of the guideway 6 in which the movable blade reciprocates and a stationary cutting blade is seated in the slot 16 in coöperative relation to the movable cutting blade. The lower end of the stationary blade preferably engages the bottom wall 19 of the guideway and also abuts against the vertical side wall 20 thereof. If desired a slot for the lower end of the stationary blade 18 may be formed in the pod, but usually this will be found unnecessary and undesirable.

By reason of this construction the stationary blade is very rigidly supported adjacent the end of the temple roller and may be placed as near the path of the edge of the fell of cloth as may be desired.

In order to maintain a constant contact between the reciprocating blade 8 and the stationary blade 18 to insure proper shearing action, a spring plate or blade 21 is seated in the slot 17 and caused to bear against the blade 8 in such a manner as to force it firmly in contact with the reciprocating blade 18. The spring plate 21 is illustrated herein as provided at its upper end with an offset portion which is seated in the slot 17, the free lower portion of the spring blade 18 bearing against the side of the blade in the manner aforesaid. The stationary blade 18 and the spring plate 21 may conveniently be anchored and retained in the slots 16 and 17 respectively by a single screw 22.

Figure 3:
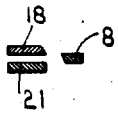
Fig. 3 is a sectional detail of the blades on the line 3—3 Fig. 2.

The coöperating edges of the movable blade 8 and the stationary blade 18 desirably are beveled to present sharp coöperating edges as illustrated in Fig. 3 while the spring plate 21 is without a beveled edge. If however, a double cutting action is desired the plate 21 may be beveled in the opposite direction to that of the blade 18 and the movable blade be constructed to present a square edge to both beveled stationary cutters. By reason of the present invention a much more rigid construction is obtained than is usual in temple thread cutters and a proper shearing coöperation between the reciprocating and stationary blades insured.

It is to be understood that the invention disclosed herein is illustrative in character and that various modifications in form and arrangement of parts may be made within the spirit and scope of the following claims.

Having thus described my invention what I claim as new and desire to secure by Letters Patent is:

1. A thread cutting temple for looms comprising a pod and a cap, a guideway in said cap and pod, a slidably mounted cutter backwardly and forwardly movable in said guideway, and a stationary cutting blade rigidly secured to said cap at the mouth of said guideway in coöperative relation to said movable cutter.

2. A thread cutting temple for looms comprising a body and a cap, a guideway in said cap and body, a slidably mounted cutter backwardly and forwardly movable in said guideway, a slot in said cap at the mouth of the guideway and a stationary cutting blade rigidly secured in said slot in coöperative relation to said movable cutter.

3. A thread cutting temple for looms comprising a pod and a cap, a guideway in said cap and pod, a cutter backwardly and forwardly movable in said guideway, a stationary cutter rigidly secured to said cap at the mouth of said guideway in coöperative relation to said movable cutter and resilient means for forcing said movable cutter into engagement with said stationary cutter whereby an effective shearing action between said cutters is insured.

4. A thread cutting temple for looms comprising a pod and a cap, a guideway in said cap and pod, a cutter backwardly and forwardly movable in said guideway, a stationary cutter rigidly secured to said cap at the mouth of said guideway in coöperative relation to said movable cutter and resilient means maintained in said cap engaging said movable cutter and maintaining the same in engagement with said stationary cutter whereby effective shearing action between said movable and stationary blades is insured.

5. A thread cutting temple for looms comprising a pod and a cap, a guideway in said cap and pod and a cutter backwardly and forwardly movable in said guideway, a boss on said cap above said guideway, vertical slots in said boss at the mouth of said guideway, a stationary cutter secured in one of said slots in coöperative relation to the movable cutter and a resilient member secured in the other slot bearing against said movable cutter and operating to maintain the same in effective shearing relation to the stationary cutter.

6. A thread cutting temple for looms comprising a cap and a pod, a guideway in said cap and pod and a cutter backwardly and forwardly movable in said guideway, a boss on said cap above said guideway, vertical slots in said boss at the mouth of said guideway, a vertical stationary cutter fixed at its upper end in one of said slots and seated at its lower end against the wall of said guideway in said pod, a resilient member seated at its upper end in the other slot and having a lower free end engaging the movable blade and adapted to maintain the same in shearing engagement with the stationary blade whereby an effective shearing action between said blades is insured.

7. A thread cutting temple for looms comprising a cap and a pod, a guideway in said cap and pod and a cutter backwardly and forwardly movable in said guideway, a boss on said cap above said guideway, vertical slots in said boss at the mouth of said guideway, a vertical stationary cutter fixed at its upper end in one of said slots and seated at its lower end against the wall of said guideway in said pod, a resilient member seated at its upper end in the other slot and having a lower free end engaging the movable blade and adapted to maintain the same in shearing engagement with the stationary blade whereby an effective shearing action between said blades is insured, said stationary blade and said resilient member being secured to said cap by a common fastening means.

In testimony whereof, I have signed my name to this specification.

EDWARD S. STIMPSON.